United States Patent
Kino et al.

[19]

[11] Patent Number: 5,825,545
[45] Date of Patent: Oct. 20, 1998

[54] IMAGE STABILIZING DEVICE

[75] Inventors: Yoshiki Kino, Tokyo; Naoya Kaneda, Chigasaki; Kazuya Matsuda, Yokohama; Youichi Iwasaki, Yokohama; Hiroyuki Wada, Yokohama; Tsuneo Takashima, Kawasaki; Harunobu Ichinose, Yokohama, all of Japan

[73] Assignee: Canon Kabushiki Kaisha, Tokyo, Japan

[21] Appl. No.: 665,079

[22] Filed: Jun. 14, 1996

Related U.S. Application Data

[63] Continuation of Ser. No. 121,506, Sep. 16, 1993, abandoned.

[30] Foreign Application Priority Data

| Sep. 21, 1992 | [JP] | Japan | 4-274849 |
| Oct. 31, 1992 | [JP] | Japan | 4-315833 |
| Jan. 21, 1993 | [JP] | Japan | 5-008395 |

[51] Int. Cl.⁶ ................................................. G02B 27/64
[52] U.S. Cl. ........................ 359/557; 359/209; 359/554; 359/831
[58] Field of Search .................... 359/554, 555, 359/556, 557, 209, 210, 211, 831, 832, 837; 396/55

[56] References Cited

U.S. PATENT DOCUMENTS

| 4,293,218 | 10/1981 | Nielsen et al. | 359/209 |
| 4,811,320 | 3/1989 | Kawasaki et al. | 359/210 |
| 4,822,974 | 4/1989 | Leighton | 359/211 |
| 5,074,628 | 12/1991 | Khattak et al. | 359/210 |
| 5,107,293 | 4/1992 | Sekine et al. | 359/554 |
| 5,181,056 | 1/1993 | Noguchi et al. | 354/70 |
| 5,189,545 | 2/1993 | Takata et al. | 359/211 |
| 5,237,450 | 8/1993 | Stromberg | 359/554 |

FOREIGN PATENT DOCUMENTS

| 3-37616 | 2/1991 | Japan . |
| 4-215625 | 8/1992 | Japan | 359/554 |

*Primary Examiner*—Paul M. Dzierzynski
*Assistant Examiner*—Darren E. Schuberg
*Attorney, Agent, or Firm*—Fitzpatrick, Cella, Harper & Scinto

[57] ABSTRACT

The present invention relates to an optical instrument such as an optical axis deflecting device or an image stabilizing device having an optical member supported for rotation about a predetermined axis and rotated about the predetermined axis to thereby deflect the optical axis of passing light, moving means adapted to move in a direction along a plane inclined by a predetermined angle from a plane perpendicular to the predetermined axis to thereby rotate the optical member about the predetermined axis, and driving means for driving the moving means. With such construction, a driving force generated by the driving means acts on that portion of the optical member which is far from the rotational shaft thereof and as a result, a driving torque for driving the optical member can be enhanced without causing the bulkiness and higher cost of the device and an increase in consumed electric power.

23 Claims, 15 Drawing Sheets

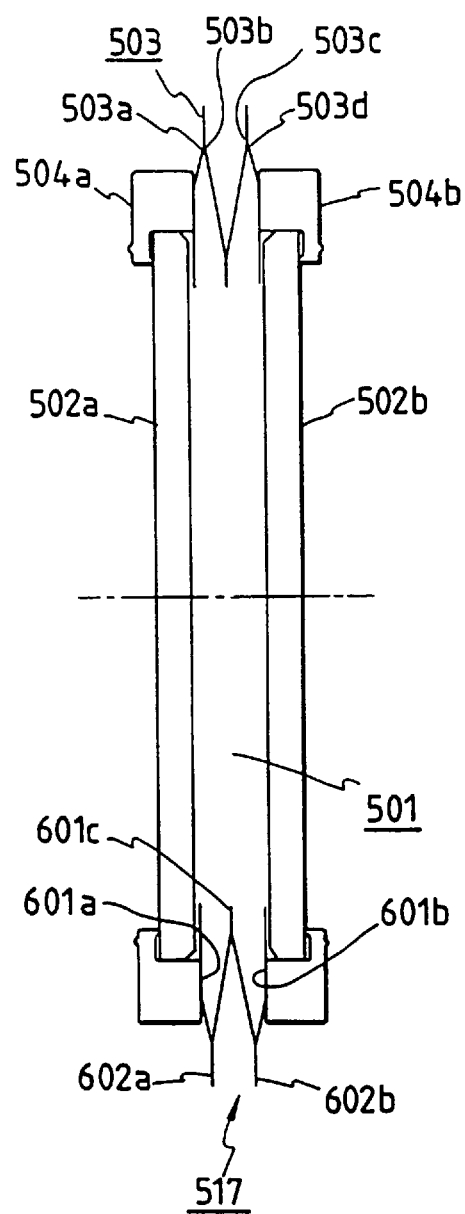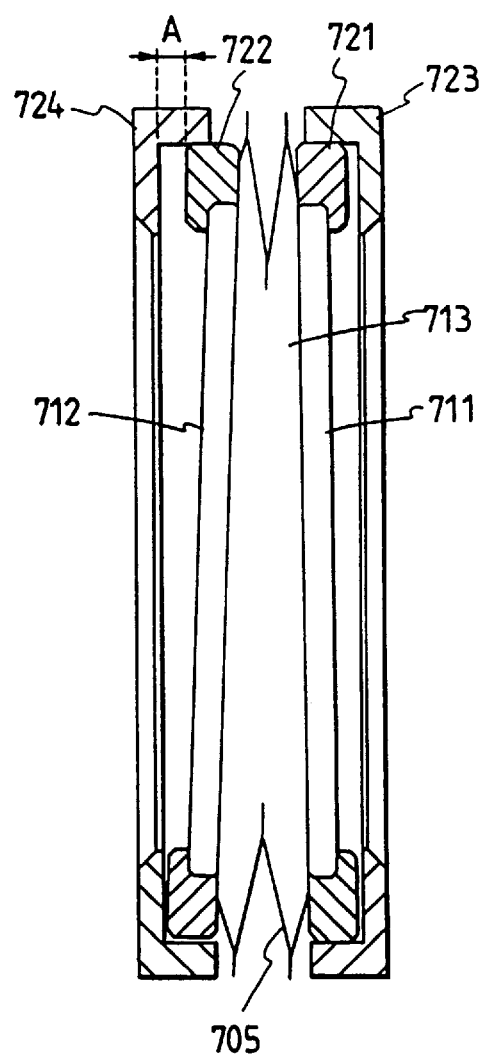
FIG. 22 PRIOR ART
FIG. 23 PRIOR ART

IMAGE STABILIZING DEVICE

This application is a continuation of application No. 08/121,506 filed Sep. 16, 1993, now abandoned.

BACKGROUND OF THE INVENTION

1. Field of the Invention

This invention relates to an image stabilizing device having correcting optical means such as a variable angle prism.

2. Related Background Art

In recent years, the automatization of photographing apparatuses such as still cameras and video cameras have been advanced and apparatuses having an automatic exposure mechanism and an automatic focus adjusting mechanism have been widely put into practical use, and several techniques for realizing the vibration correcting function for correcting image vibration attributable to the vibration of the entire apparatus have also been practically used.

FIG. 16 of the accompanying drawings schematically shows the construction of an optical device for effecting vibration correction according to the prior art.

In FIG. 16, the reference characters 802a and 802b designate two transparent plates opposed to each other. A space hermetically sealed by these transparent plates and transparent film 803 sealing the outer peripheries thereof is filled with liquid of a high refractive index (not shown), and these together constitute a variable angle prism.

The reference characters 804a and 804b denote frame members sandwiching the variable angle prism therebetween. These frame members 804a and 804b hold the transparent plates 802a and 802b, each forming a part of the variable angle prism for rotation about a pitch axis 805a and a yaw axis 805b. The reference character 806a designates a flat type coil secured to one end of the front side frame member 804a, and a permanent magnet 807a and yokes 808a, 809a are disposed in opposed relationship with the opposite surfaces of the flat type coil, and these together constitute a closed magnetic circuit. The reference character 811a denotes an arm formed integrally with the frame member 804a and having a slit 810a therein. The reference characters 812a and 813a designate a light emitting element such as an IRED and a light receiving element such as a PSD disposed at opposed locations with the slit 810a interposed therebetween, the output of the light receiving element being variable by the position of the spot of a light beam received thereby. A light beam emitted from the light emitting element 812a is transmitted through the slit 810a and thereafter is applied to the light receiving element 813a.

The reference characters 814a and 814b denote vibration detectors attached to the supporting portion of the apparatus so as to be capable of detecting the amounts of vibration of the entire apparatus in the pitch direction and the yaw direction. The reference numeral 815 designates a control circuit such as a microcomputer which governs the control of the entire apparatus, the reference numeral 816 denotes a coil driving circuit for driving the flat type coil 806a in accordance with a driving signal from the control circuit 815, and the reference numeral 817 designates the acting point of the flat type coil 806a which does not appear in the space.

Although not shown, a flat type coil 806b, a permanent magnet 807b, yokes 808b, 809b, a slit 810b, an arm 811b, a light emitting element 812b and a light receiving element 813b are disposed in the yaw direction and function similarly to the operation of the pitch side.

In the above-described example of the prior art, a driving torque for driving the variable angle prism in the pitch direction, for instance, is determined by the product of the spacing (distance) between the acting point 817 and the yaw axis 805a and a driving force produced from the magnetic circuit formed by the flat type coil 806a, the permanent magnet 807a and the yokes 808a, 809a. Therefore, to increase the driving torque, it would occur to enlarge the spacing between the acting point 817 and the yaw axis 805a or to enhance the driving force of the magnetic circuit of the above-described construction.

However, the former would result in a larger size and increased cost of the magnetic circuit portion, and the latter would result in an increase in an electric current to be input to the flat type coil 806b and an increase in the electric power consumed by the magnetic circuit.

FIGS. 17 to 19 of the accompanying drawings show a photographing apparatus 152 incorporating the optical device as shown in FIG. 16 as vibration correcting means therein, FIG. 17 being a front view, FIG. 18 being a transverse plan view along the line Y—Y of FIG. 17, and FIG. 19 being a transverse side view along the line X—X of FIG. 17.

In FIGS. 17 to 19, the reference characters 912a and 912b designate two transparent plates such as glass plates opposed to each other. These two transparent plates 912a and 912b have their outer peripheries sealed by bellows-like films 913, and the space thus hermetically sealed is filled with liquid of a high refractive index (not shown), and these together constitute a variable angle prism 151.

The films 913 are joined together by heat welding, and are formed with two to three stages of bellows so that the variable angle prism can be inclined in any direction so as to have a vertical angle.

This variable angle prism is held between a frame member 914a having a pitch axis 915a and a frame member 914b having a yaw axis 915b, and the transparent plates 912a and 912b are held for rotation about the pitch axis 915a and the yaw axis 915b, respectively. The frame members 914a and 914b are polyethylene rings and join the transparent plates 912a and 912b to the films 913.

The front side frame member 914a has a flat type coil 916a secured to one end thereof, and a permanent magnet 917a and yokes 918a, 919a are disposed in opposed relationship with the opposite surfaces thereof to thereby constitute a closed magnetic circuit as driving means 953. Also, an arm 921a having a slit 920a is provided at the symmetrical position of the front side frame member 914a with respect to the coil 916a, and a light emitting element 922a and a light receiving element 921a are disposed at the opposite sides of the arm 921a in opposed relationship with each other, and a light beam emitted from the light emitting element 922a is transmitted through the slit 920a and thereafter is applied to the light receiving element 923a.

The light emitting element 922a is an infrared light emitting element such as an IRED, and the light receiving element 923a is a photoelectric conversion element such as a PSD the output of which is varied by the position of the spot of a light beam received thereby.

Although not shown, a flat type coil 916b, a permanent magnet 917b, yokes 918b, 919b, a slit 920b, an arm 921b, a light emitting element 922b and a light receiving element 923b are disposed on the yaw side, and function similarly to the operation of the pitch side.

In the example of the prior art shown in FIGS. 17 to 19, however, generally the variable angle prism 151 is of a circular shape and around it, there are disposed the frame members 914a, 914b for holding the transparent plates 912a, 912b with the vertical angle thereof being variable, a driving unit for variable angle driving (flat coils 916a, 916b, yokes 918a, 918b, 919a, 919b, angle sensors 922a, 922b, 923a, 923b, etc.), arm members 921a, 921b for connecting the frame members and the driving coils together, etc. and therefore, the vibration correcting device, when viewed from the object side, is of a shape having a protruding portion in the outer peripheral direction thereof.

That is, in FIG. 17, H represents the height of the protruding portion, and the value of this height H is determined by the sum of a height a determined by the diagonal length of an image pickup surface and a height h determined by the other parts heaped up in the diametrical direction. As a result, there have been problems that the external shape of the device becomes large and this is disadvantageous for the downsizing of the entire apparatus and that there are protruding portions in two directions orthogonal to each other and therefore the disposition of a lens in the device becomes limited.

FIG. 20 of the accompanying drawings is a schematic view showing the construction of a variable angle prism 417 according to the prior art. This variable angle prism is liquid-tightly connected to the outer peripheral portions of a pair of transparent plates 402a and 402b such as glass plates opposed to each other by bellows-like film (bellows) 404 attached thereto with relay members 403a and 403b interposed therebetween, and this liquid-tight space is filled with transparent liquid 401 of a high refractive index.

The above-mentioned bellows portion is formed by four sheets of doughnut-shaped film 404a being alternately welded to the inner periphery and the outer periphery thereof, and in the initial state in which the liquid-tight space is filled with the transparent liquid 401 and the transparent plates 402a and 402b are parallel to each other, the outer peripheral portion of the film keeps a predetermined clearance L1 as shown in FIG. 19. This variable angle prism 417 is held between a holding frame 405 having a pitch axis 405a and a holding frame 406 having a yaw axis 406a, and the transparent plates 402a and 402b are held for rotation about the pitch axis 405a and the yaw axis 405b, respectively.

FIG. 21 of the accompanying drawings shows a variation in the shape of the bellows portion when the pitch side glass plate 402a is inclined by a predetermined rotation angle θ from its normal state shown in FIG. 19, and shows that the portions of the outer peripheral portion of the film which are orthogonal to the rotational axis 405a are closest to each other and the clearance is only L2.

In the example of the prior art shown in FIG. 21, if the shape of the bellows portion is formed as per design value, the clearance L2 can be secured between the outer peripheries of the films in the initial state, but the films used are very thin and soft with the driving force taken into account, and this has lead to a problem that the irregularity of shape due to the manufacturing conditions is great and the outer peripheral portions of the films somewhat fall down or become wavy, whereby before the glass plate 402a rotated by the predetermined rotation angle θ, the outer peripheral portions of the films contact therewith and a load torque increases and predetermined rotation θ cannot be secured.

FIG. 22 of the accompanying drawings is a schematic view of the variable angle prism. In FIG. 22, the reference characters 502a and 502b designate two transparent plates such as glass plates opposed to each other, the reference characters 503a, 503b, 503c and 503d denote four sheets of laminate film formed chiefly of polyethylene for constituting bellows 503, the reference characters 504a and 504b designate polyethylene rings provided on the outer peripheries of the transparent plates 502a and 502b to join the transparent plates and the film 503 together, the reference characters 601a and 601b denote the joint portions by welding between the films 503a, 503d and the polyethylene rings 504a, 504b, the reference character 601c designates the joint portion by welding between the films 503b and 503c, and the reference characters 602a and 602b denote the joint portions by welding between the films 503a and 503b and between the films 503c and 503d, and the hermetically sealed space thereof is filled with liquid 501 of a high refractive index (not shown), and these together constitute a variable angle prism 517 as vibration correcting means.

The films 503 are joined together by heat welding, whereby two to three stages of bellows are formed so that the variable angle prism 517 can be inclined in any direction so as to have a vertical angle.

The variable angle prism shown in FIG. 22, however, has liquid put into the interior thereof, whereby the films 503a, 503b, 503c and 503d change from their original flat shape to the shape of a three-dimensional conical slope and therefore, deformation such as wrinkling is inevitably created.

This has led to a problem that when the variable angle prism is driven, there occurs an effect similar to that of film having a rib and the load for driving increases.

There has also been a problem that the convex portions of the wrinkles of adjacent films collide with each other and the load for driving increases remarkably.

Further, wrinkles are formed quite at random, and this has led to a problem that during mass production, the irregularity of the load for driving is very great between individual ones of variable angle prisms and good products of a small load can be manufactured in a great deal, while bad products of a great load are also manufactured in a great deal and the yield of mass production is aggravated.

FIG. 23 of the accompanying drawings is a cross-sectional view of a variable angle prism and a holding frame that holds it. These will hereinafter be described with reference to FIG. 23. The variable angle prism is comprised of a pair of transparent flat plates 711 and 712 facing each other, fixing frames 721 and 722 for fixing the pair of transparent flat plates 711 and 712, respectively, deformable bellows-like film 705 (bellows) for coupling the end surfaces of the variable angle prism comprising the transparent flat plate 711 and the fixing frame 721 or the transparent flat plate 712 and the fixing frame 722, and transparent liquid 713 such as silicon filling the space between a pair of end surfaces 711, 721 or 712, 722 and the film 705.

A pair of holding frames 723 and 724 for holding the variable angle prism therebetween are disposed at the opposite sides of the variable angle prism, and one of the holding frames has a rotating shaft (not shown) capable of rotating one of the end surfaces including the transparent flat plates in the pitch direction (vertically), and the other holding frame has a rotating shaft (not shown) capable of rotating the other end surface in the yaw direction (horizontally), and the holding frames are held by fixed cylinders (not shown) each having a bearing portion corresponding to each rotating shaft.

Heretofore, the fixing frames 721 and 722 forming the end surfaces of the variable angle prism with the transparent flat plates and the holding frames 723 and 724 have been secured together by an adhesive agent soft to some extent through fixed rings formed on the outer peripheries of the transparent flat plates.

Now, this adhesive agent has a disadvantage because it takes a considerable time before it dries and much time is required for the manufacture of the prism. There has also been a disadvantage that the thickness of the variable angle prism is liable to become irregular. Particularly where a thin element is used, floating (see A in FIG. 23) occurs between the holding frame and the fixing frame and the fixing frame is adhesively secured to the holding frame with an inclination with respect to the latter, and in spite of the holding frames 723 and 724 (FIG. 23) being parallel to each other, the transparent flat plates 711 and 712 (FIG. 23) become non-parallel to each other, whereby the standard of a vertical angle 0° has sometimes shifted.

On the other hand, as a method of fixing the fixing frames and the holding frames, it would occur to screw the fixing frames and the holding frames, but in such case, there has been a problem that the parts become bulky and further, distortion is created in the transparent flat plates 711 and 712 which are optical glass under the influence of the swell of prepared holes during the screwing.

SUMMARY OF THE INVENTION

One aspect of the present invention is an optical instrument such as an optical axis deflecting device or an image stabilizing device having an optical member supported for rotation about a predetermined axis and rotated about the predetermined axis to thereby deflect the optical axis of passing light, moving means adapted to move in a direction along a plane inclined by a predetermined angle from a plane perpendicular to the predetermined axis to thereby rotate said optical member about the predetermined axis, and driving means for driving said moving means. By the above-described construction, the driving torque for driving the optical axis deflecting member can be enhanced without causing the bulkiness and higher cost of the driving means and further an increase in consumed energy for driving.

BRIEF DESCRIPTION OF THE DRAWINGS

FIG. 22 is a cross-sectional view showing the construction of a variable angle prism according to the prior art.

FIG. 23 is a cross-sectional view of the variable angle prism of an image vibration correcting device according to the prior art and a holding frame holding it.

DESCRIPTION OF THE PREFERRED EMBODIMENTS

Figure 1:
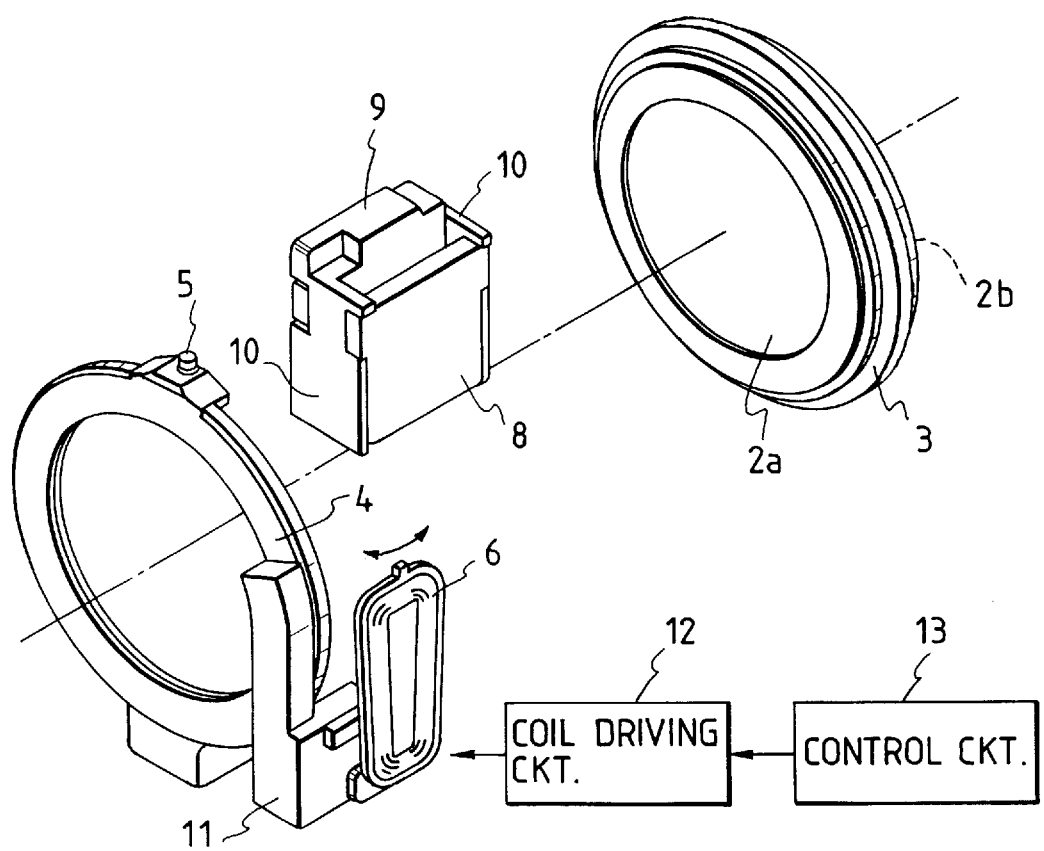
FIG. 1 is a mechanism illustration showing the construction of the essential portions of an optical instrument in a first embodiment of the present invention.

The present invention will hereinafter be described in detail with respect to some embodiments thereof shown in the drawings.

Referring to FIG. 1 which shows the mechanism and circuit construction of the essential portions of an optical instrument in an embodiment of the present invention, the reference characters 2a and 2b designate two transparent plates opposed to each other, and a space hermetically sealed by these transparent plates and transparent film 3 sealing the outer peripheries thereof is filled with liquid of a high refractive index (not shown), and these together constitute a variable angle prism.

The reference numeral 4 denotes a front side frame member for holding the variable angle prism. This front side frame member 4 holds the transparent plates 2a and 2b forming parts of the variable angle prism for rotation about a yaw shaft 5. The reference numeral 6 designates a flat type coil secured to one end of the front side frame member 4, and a permanent magnet (not shown) and yokes 8 and 9 are disposed in opposed relationship with the opposite surfaces of the flat type coil 6, and further a member 10 for disposing these in opposed relationship with one another is disposed perpendicularly to these, and the flat type coil 6 to the member 10 together constitute a closed magnetic circuit. The reference numeral 11 denotes an arm for holding the flat type coil 6 and for transmitting power to the front side frame member 4.

The reference numeral 12 designates a coil driving circuit for driving the magnetic circuit, and the reference numeral 13 denotes a control circuit such as a microcomputer which governs the control of the device.

The operation of the present device of the above-described construction will now be described.

The amount of coil driving is determined by the coil driving circuit 12 in accordance with a driving signal from the control circuit 13. This amount of driving is input to the magnetic circuit constructed as described above, and a driving force created there is transmitted to the front side frame member 4 through the arm 11 and thus, the variable angle prism held by the front side frame member 4 is rotated about the yaw shaft 5. Thereby, light incident from the front of the front side frame member 4 passes through the variable angle prism, whereby the optical axis of the light is varied with a result that vibration correction is done.

In the present embodiment, the magnetic circuit is disposed so that the direction of motion thereof may not substantially intersects the axial direction of the yaw shaft 5.

Figure 2A:
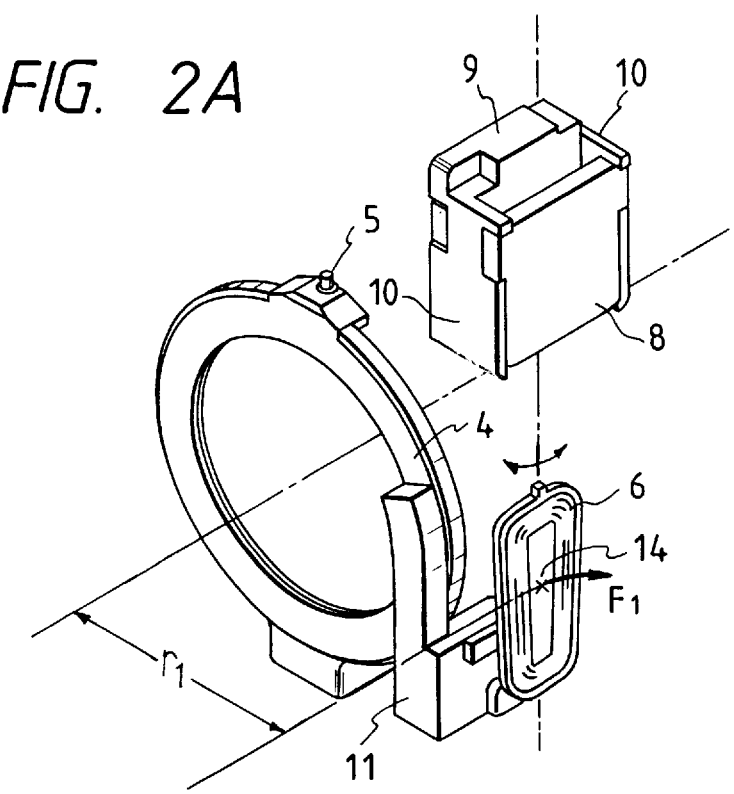
FIGS. 2A and 2B are views for illustrating the driving torque of a variable angle prism in the system of the first embodiment of the present invention and that in the prior-art system.
Figure 2B:
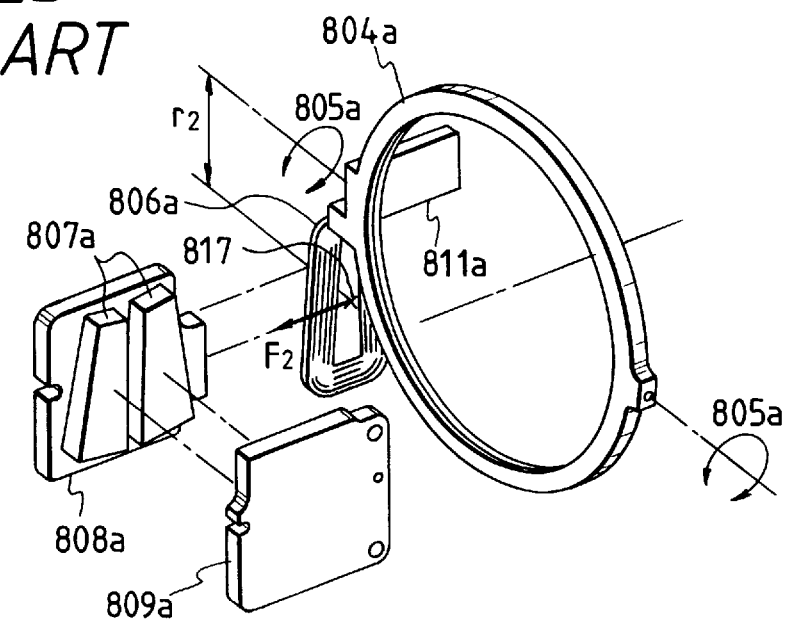
Figure 16:
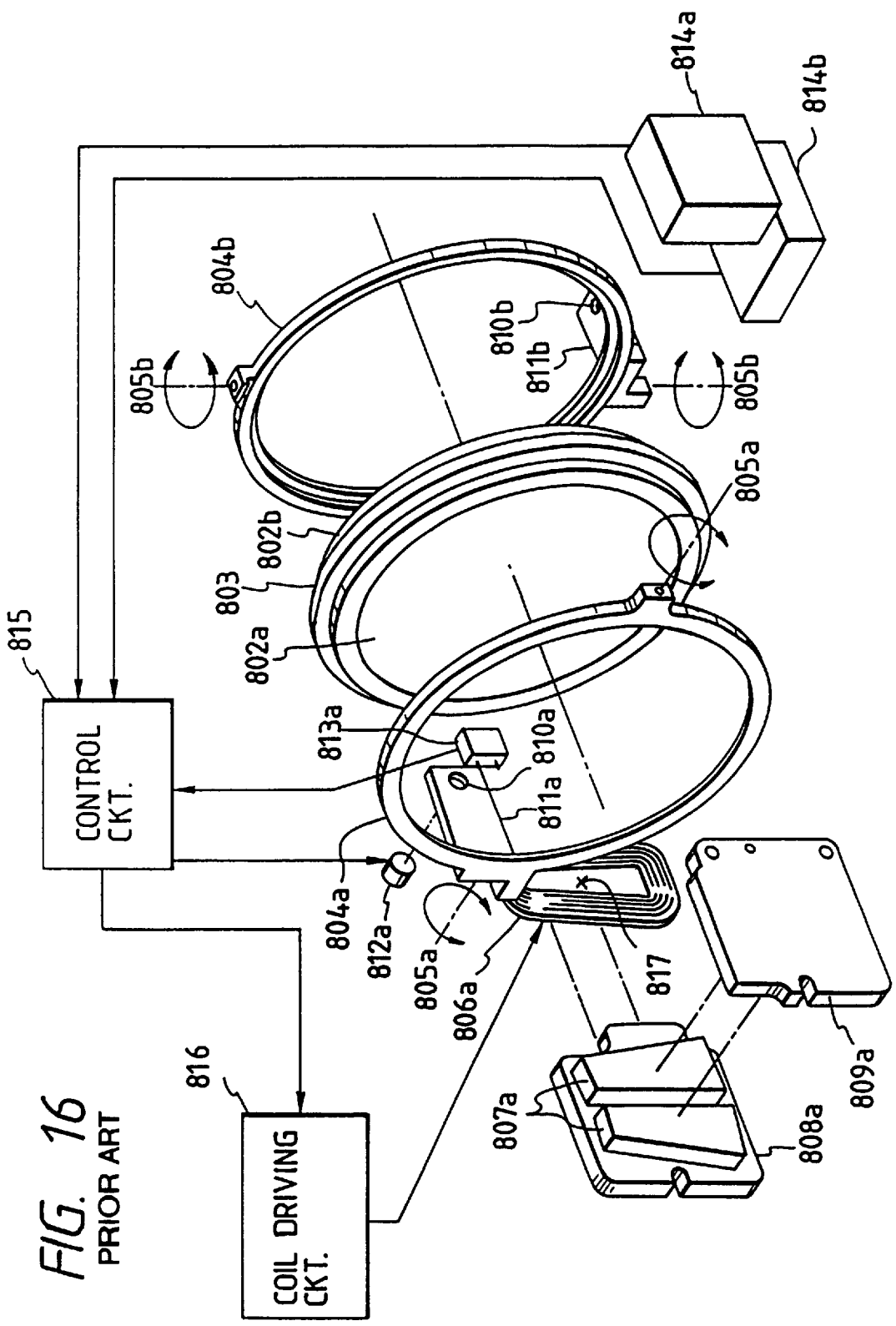
FIG. 16 is a mechanism illustration of an optical instrument having the light beam deflecting function according to the prior art.

FIG. 2A is a view for illustrating that a higher torque is obtained by this arrangement than by the prior-art arrangement, and in FIG. 2A, the same portions as those in FIGS. 1 and 16 are given the same reference numerals.

In FIG. 2A, the reference numeral 14 denotes the acting point of the flat type coil 6, and it is a point which does not appear in the space as in the prior art.

The driving torque is represented as follows:

Driving torque=$r_i \times F_i$, ∴i=1, 2 where $r_i$ is the distance from the yaw shafts 805a, 5 to the acting point of the flat type coils 806a, 6, and Fi is the driving force of the flat type coils 806a, 6.

From the above expression, it is obvious that if the driving forces Fi of the flat type coils 806a and 6 in the system of the present embodiment and the system according to the prior art are the same, the magnitude of the driving torque for driving the variable angle prism depends on the distance $r_i$.

So, in the present embodiment, the magnetic circuit is disposed so as not to intersect the axial direction of the yaw shaft 5 and therefore, the distance $r_1$ in FIG. 2A can be made greater than $r_2$ and the driving torque can be enhanced.

Also, it is unnecessary to enlarge the magnetic circuit and this does not result in an increased cost of the device.

Further, since it is possible to enhance the driving torque, the electric power necessary to obtain a driving torque as required in the prior art may be less. Thus, it becomes possible to downsize a battery which is a power source necessary for the present device.

While FIG. 2A shows the yaw direction alone, construction is similar also in the pitch direction.
(Modifications)

Although in the present embodiment, the variable angle prism is used as means for deflecting light, use may be made of anything for deflecting light, such as a glass plate.

Further, the magnetic circuit is used for driving the light deflecting means, but it may be replaced by a piezo-electric element, a linear motor, a voice coil motor or the like.

As described above, according to the first embodiment of the present invention, provision is made of driving means for rotating the light deflecting means through the rotating support means disposed so that relative to the rotational shaft of the rotating support means, the direction of a motion thereof may not substantially intersect the axial direction of said rotational shaft, and design is made such that the direction of motion of said driving means does not substantially intersect the axial direction of the rotational shaft of the rotating support means.

Consequently, it becomes possible to enhance the driving torque for driving the light deflecting means without causing the bulkiness and higher cost of the driving means and, further, an increase in consumed electric power.

A second embodiment of the present invention will hereinafter be described with reference to FIG. 3.

Figure 3:
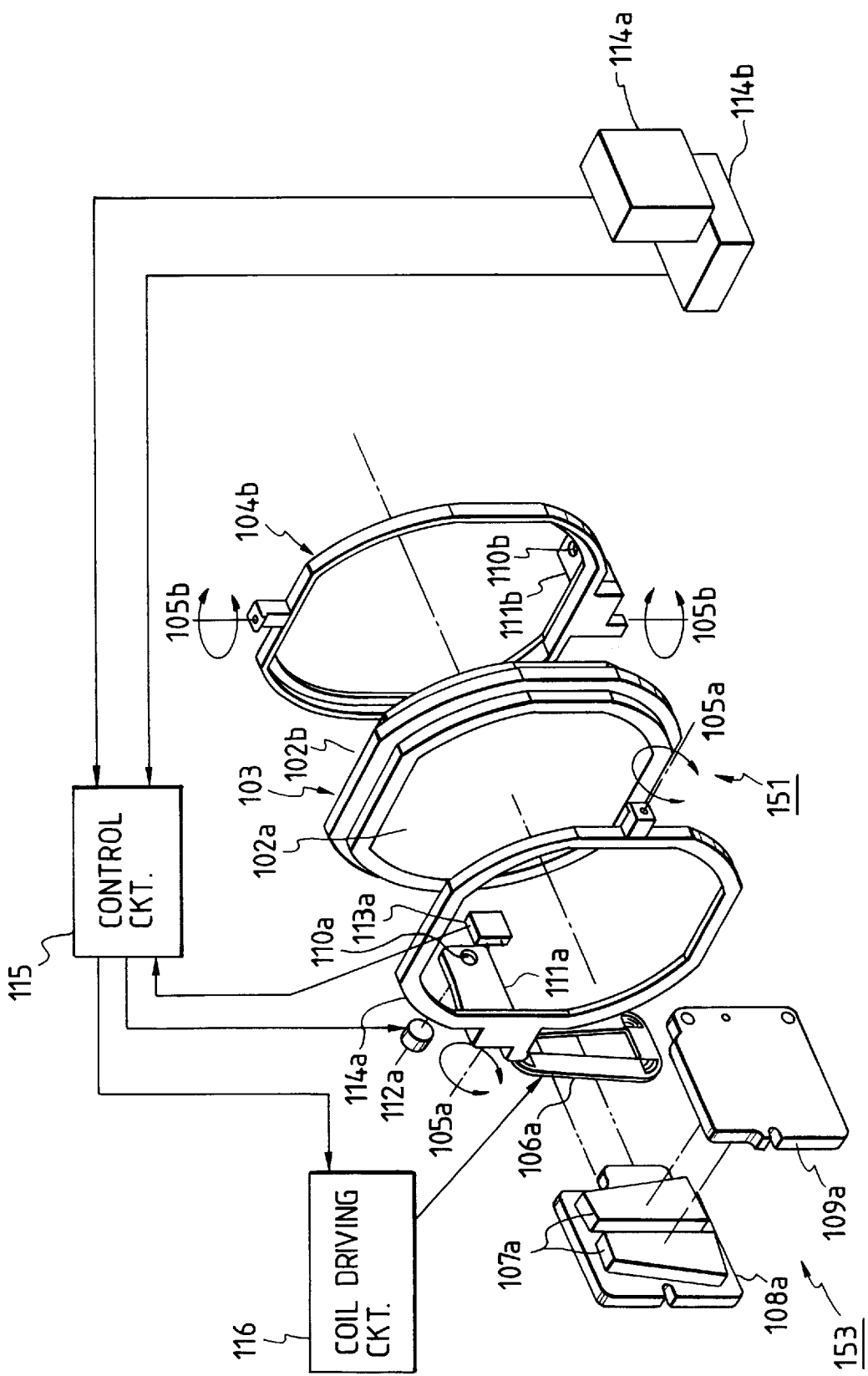
FIG. 3 is an exploded perspective view showing a second embodiment of the present invention.

In FIG. 3, the reference characters 102a and 102b designate two transparent plates opposed to each other. These two transparent plates 102a and 102b have their outer peripheries sealed by bellows-like films 103, and the hermetically sealed space thereof is filled with liquid 101 of a high refractive index (not shown), and these together constitute a variable angle prism 151.

The films 103 are joined together by heat welding and two to three stages of bellows are formed so that the variable angle prism can be inclined in any direction so as to have a vertical angle.

The variable angle prism 151 is held between a frame member 104a having a pitch axis 105a and a frame member 104b having a yaw axis 105b, and the transparent plates 102a and 102b are held for rotation about the pitch axis 105a and the yaw axis 105b, respectively. The frame members 104a and 104b are polyethylene rings which join the transparent plates 102a, 102b and the films 103 together.

The front side frame member 104a has a flat type coil 106a secured to one end thereof, and permanent magnets 107a and yokes 108a, 109a are disposed in opposed relationship with the opposite surfaces of the flat type coil, and these together constitute a closed magnetic circuit as driving means 153.

An arm 111a having a slit 110a is provided at the symmetrical location on the front side frame member 104a with respect to the coil 106a, and a light emitting element 112a and a light receiving element 113a are disposed in opposed relationship with each other at the opposite sides of the arm 111a so that a light beam emitted from the light emitting element 112a may be transmitted through the slit 110a and thereafter applied to the light receiving element 113a.

The light emitting element 112a is an infrared light emitting element such as an IRED, and the light receiving element 113a is a photoelectric conversion element such as a PSD, the output of which is varied by the position of the spot of the received light beam.

On the supporting portion of the device, vibration detectors 114a and 114b as vibration detecting means with respect to the pitch direction and the yaw direction are mounted so as to be able to detect the amounts of hand vibration of the entire device in the pitch direction and the yaw direction. Although not shown, a flat type coil 106b, permanent magnets 107b, yokes 108b, 109b, a slit lob, an arm 111b, a light emitting element 112 and a light receiving element 113b are also disposed on the yaw side, and these function similarly to the operation of the pitch side.

The reference numeral 115 denotes a control circuit as control means comprised of an A/D converter, a D/A converter, a CPU, a memory, etc. and receiving the detection signals of the vibration detectors 114a and 114b as inputs and controlling the system. The reference numeral 116 designates a coil driving circuit for supplying an electric current to the coils 106a and 106b in accordance with the command of the control circuit 115.

The operation of the second embodiment of the above-described construction will now be described.

When a vibration occurs to the entire apparatus due to the vibration or the like of the hands holding the photographing apparatus, the vibration detectors 114a and 114b each output a signal proportional to the magnitude of the hand vibration. These signals are input to the control circuit 116 and are multiplied by an appropriate multiplier, whereby the magnitude of the vertical angle necessary to eliminate the above-mentioned vibration is calculated.

On the other hand, the angles of rotation of the opposed transparent plates 102a and 102b about the axes 105a and 105b, respectively, i.e., the fluctuations of the vertical angle of the variable angle prism in the pitch and yaw directions, give birth to the movement of the position of the spot on the light receiving surface when light beams emitted from the light emitting elements 112a and 112b are transmitted through the slits 110a and 110b, respectively, formed in the arms 111a and 111b of the frame members 104a and 104b rotated with the opposed transparent plates 102a and 102b and are applied to the light receiving elements 113a and 113b, respectively. The light receiving elements transmit to the control circuit 115 outputs conforming to the amount of movement of the spot, i.e., the magnitude of the vertical angle of the variable angle prism.

The control circuit 115 calculates the difference between the aforementioned calculated magnitude of the vertical angle and the magnitude of the vertical angle at the present point of time, and transmits to the coil driving circuit 116 the result obtained by multiplying said difference by a predetermined amplification factor as a driving command signal for the coils 106a and 106b. The coil driving circuit 116 supplies the coils 106a and 106b with a driving current conforming to the coil driving command signal to thereby produce a coil driving force.

The variable angle prism effects its rotational motion about the axes 105a and 105b by this coil driving force and is deformed so as to coincide with the aforementioned magnitude of the vertical angle. That is, the variable angle prism is designed to effect the correction control of the vibration by a feedback control rule with the value of the vertical angle calculated so as to correct the vibration as a reference signal and with the current value of the vertical angle as a feedback signal.

Figure 4:
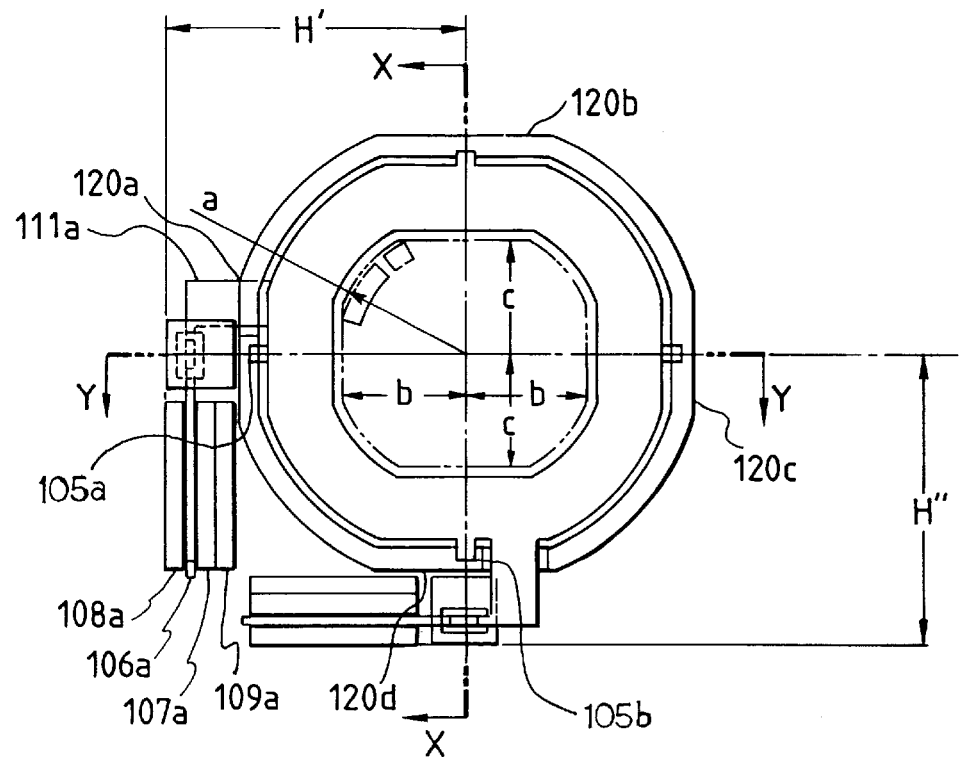
FIG. 4 is a front view of a photographing apparatus incorporating therein a vibration correcting device which is the second embodiment of the present invention as it is seen from the object side.
Figure 5:
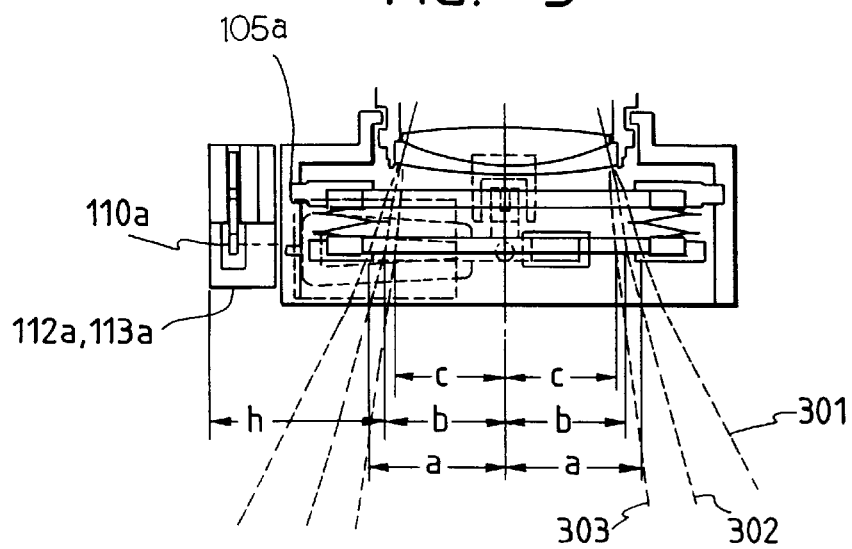
FIG. 5 is a transverse plan view along the line Y—Y of FIG. 4.
Figure 6:
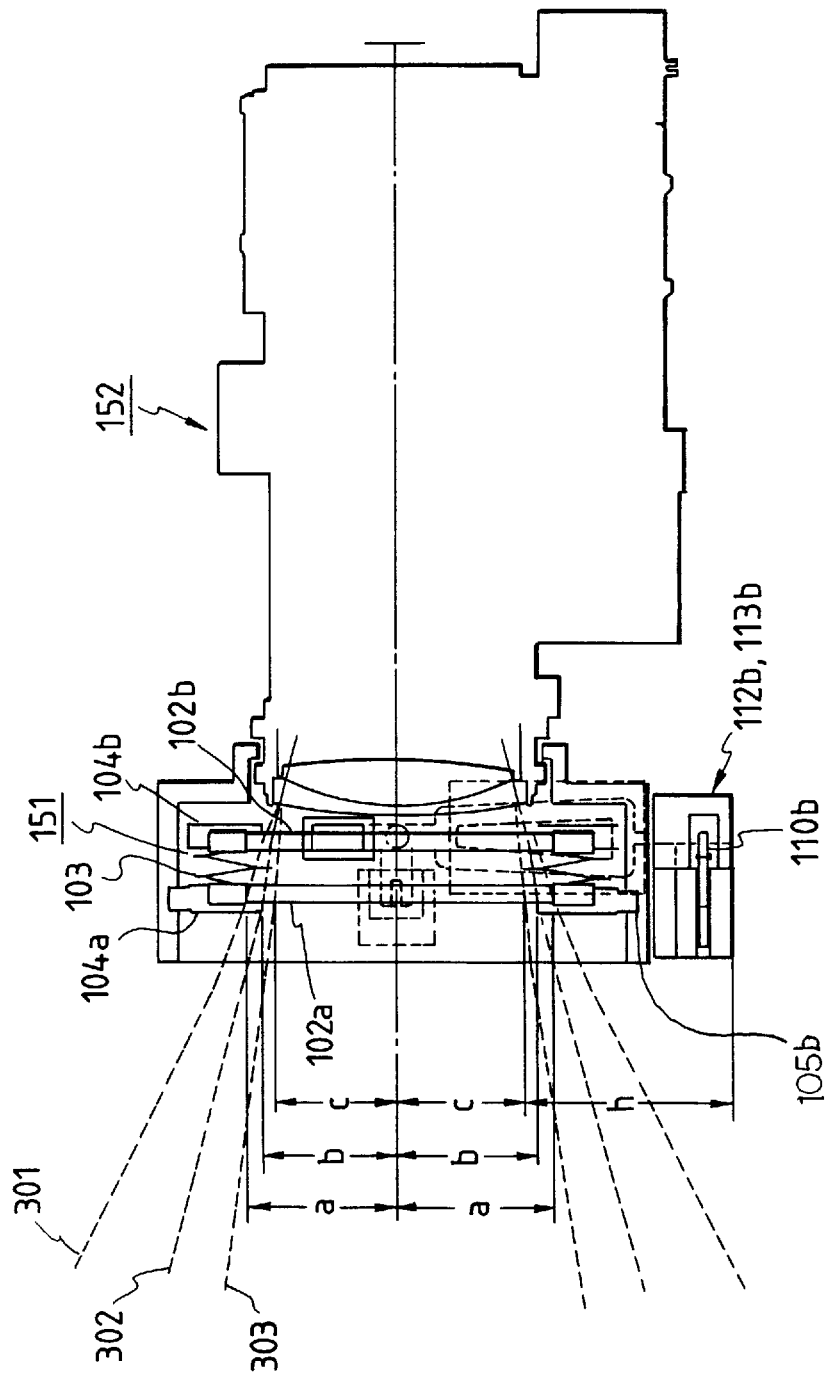
FIG. 6 is a transverse side view along the line X—X of FIG. 4.

FIG. 4 is a front view of a photographing apparatus 152 incorporating the vibration correcting device of the second embodiment therein as it is seen from the object side, FIG. 5 is a transverse plan view along the line Y—Y of FIG. 4, and FIG. 6 is a transverse side view along the line X—X of FIG. 4. In these figures, the reference numeral 301 represents an effective light beam determined by the diagonal length of an image pickup surface, the reference numeral 302 represents an effective light beam determined by the horizontal length of the image pickup surface, and the reference numeral 303 represents an effective light beam determined by the vertical length of the image pickup surface.

In the case of the present embodiment, as shown in FIG. 4, shafts 105a and 105b are provided as the other means or members than the vibration correcting means in spaces 120a to 120 d provided by eliminating the portions through which the effective light beams do not pass and making a shape corresponding to the shape of the image pickup surface and therefore, the height H' of a leftwardly protruding portion can be made into the sum of a height b determined by the effective light beam 302 corresponding to the horizontal length of the image pickup surface and a height h determined by other parts heaped up in the diametrical direction.

Likewise, the height H" of a downwardly protruding portion can be made into the sum of a height c determined by the effective light beam 303 corresponding to the vertical length of the image pickup surface and the aforementioned height h. As a result, the height of the protruding portion can be made small.

Figure 17:
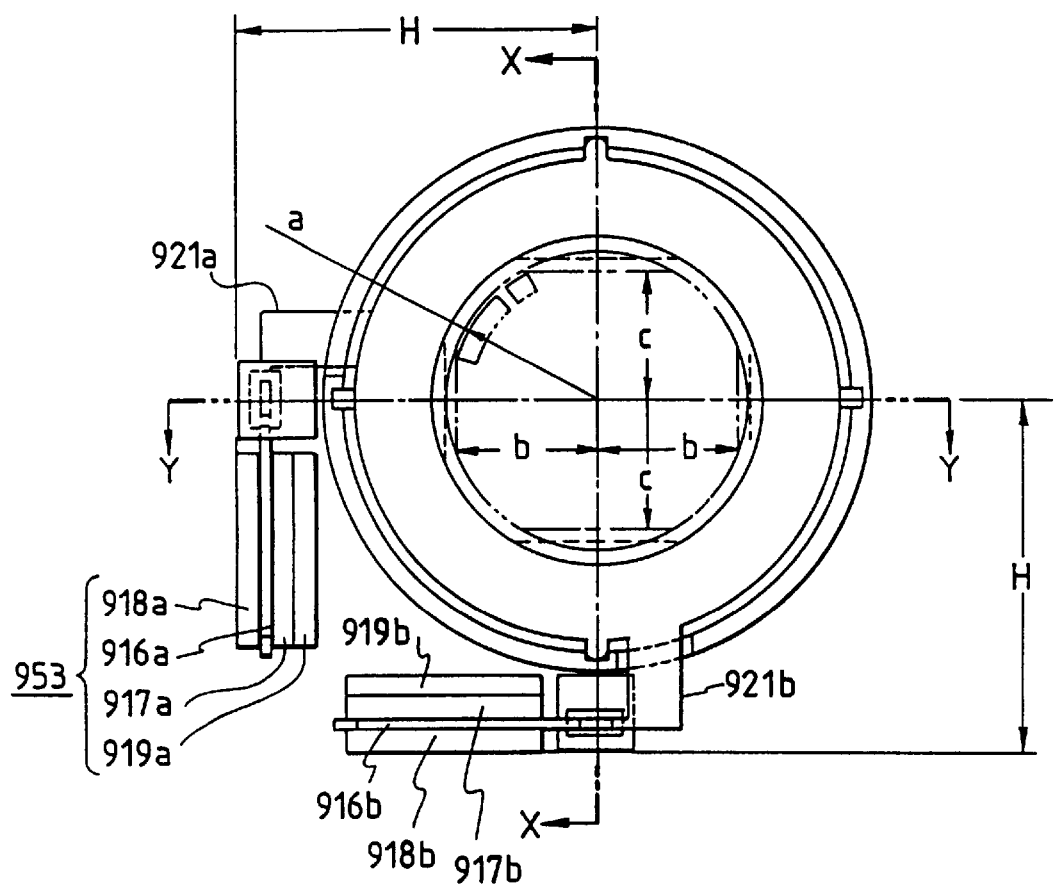
FIG. 17 is a front view of a photographing apparatus incorporating therein a vibration correcting device according to the prior art.
Figure 18:
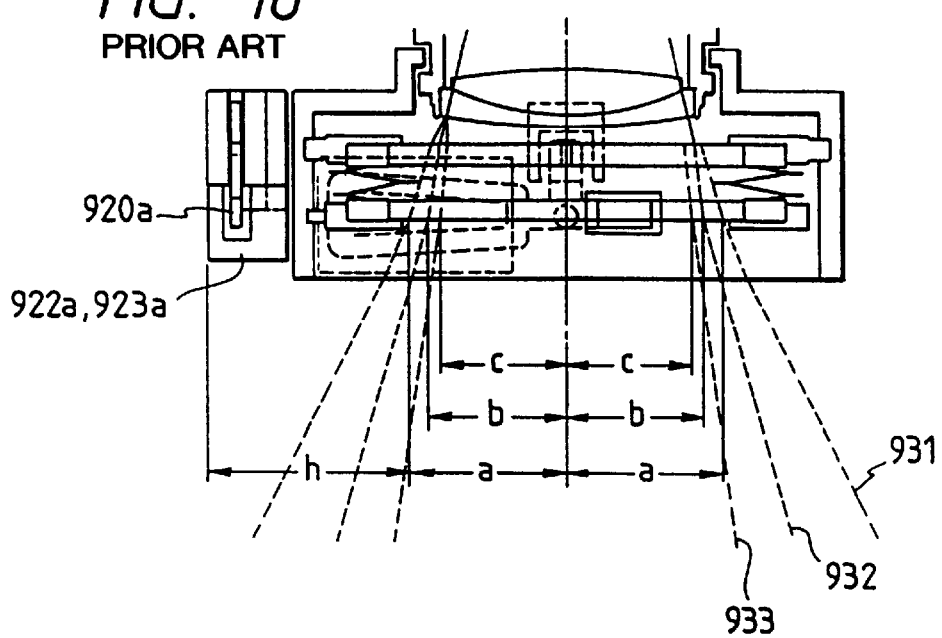
FIG. 18 is a transverse plan view along the line Y—Y of FIG. 17.
Figure 19:
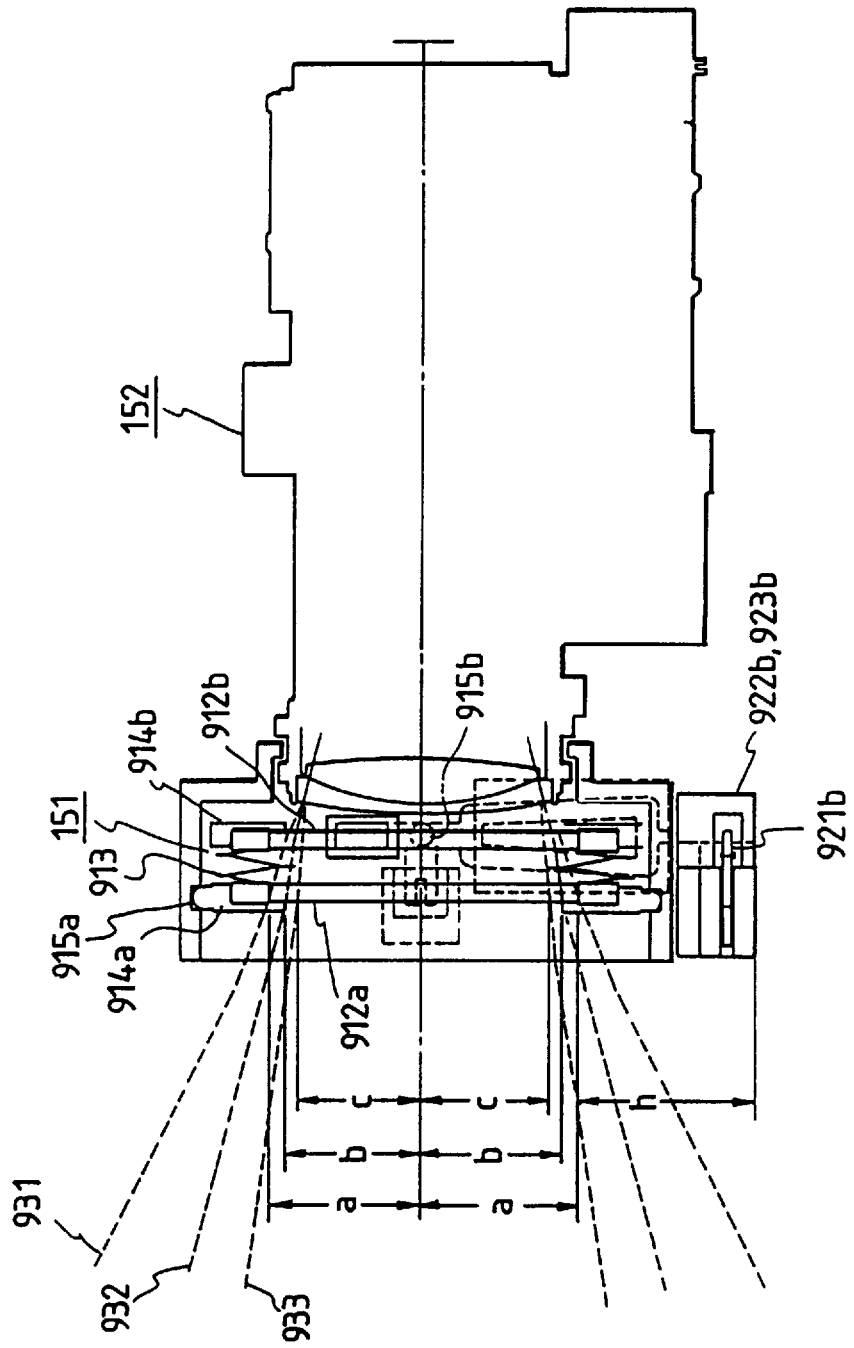
FIG. 19 is a transverse side view along the line X—X of FIG. 17.

That is, the relations between the heights H' and H" of the protruding portions in the present embodiment and the height H of the protruding portion in the example of the prior art shown in FIGS. 17 to 19 are $$H>H'>H'',$$

where
H=a+h (h is constant)
H'=b+h
H"=c+h
a>b>c.

When it is assumed that the ratio among the diagonal length, the horizontal length and the vertical length of the image pickup surface is most general 5: 4: 3, the rough ratio among a, b and c in this case assumes, due to the distortion of the photographing optical system, a value like $$a:b:c=5\times(1-0.05):4\times(1-0.04):3\times(1-0.03).$$

As described above, according to the second embodiment of the present invention, the other means or members than the vibration correcting means are disposed in the space created by making the shape of the effective portion of the variable angle prism as the vibration correcting means into a shape corresponding to the square shape of the image pickup surface by eliminating the portions through which the effective light beams do not pass through and therefore, the dimensions of the protruding portion toward the outer periphery of the vibration correcting device can be made small, and this leads to the effect that the downsizing and good unification of the entire apparatus incorporating this vibration correcting device can be realized.

Figure 7:
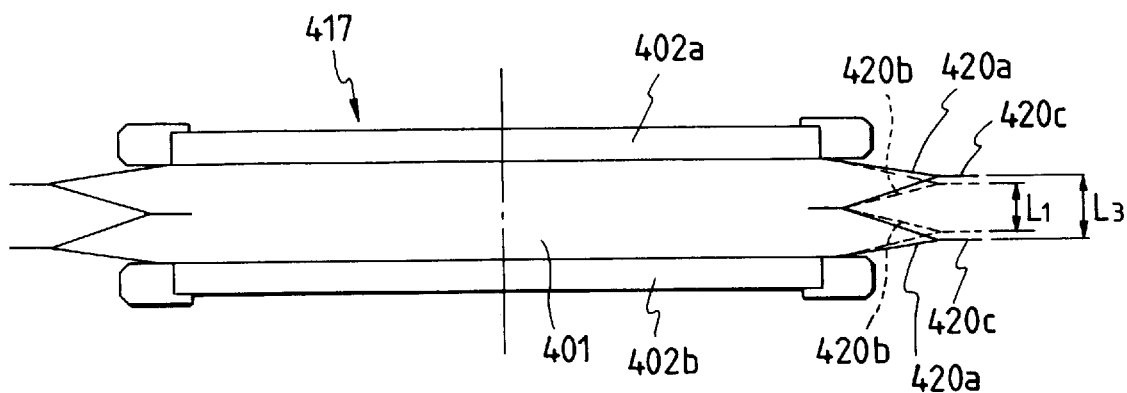
FIG. 7 is a front view of a variable angle prism showing a third embodiment of the present invention.

A third embodiment of the present invention will now be described. FIG. 7 is a front view of a variable angle prism showing the third embodiment of the present invention. By the non-contact means of changing the hardness of the outer two films 420a and inner two films 420b of four films constituting a bellows portion, the contact between the outer peripheral portions of the films is prevented. As the means for changing the hardness, the materials or thicknesses of the films 420a and 420b are changed to thereby make the inner two films 420b softer relative to the outer two films 420a, whereby when the prism is filled with transparent liquid 401, the deformation of the outer films 420a become little and the deformation of the inner films 420b becomes great.

Figure 20:
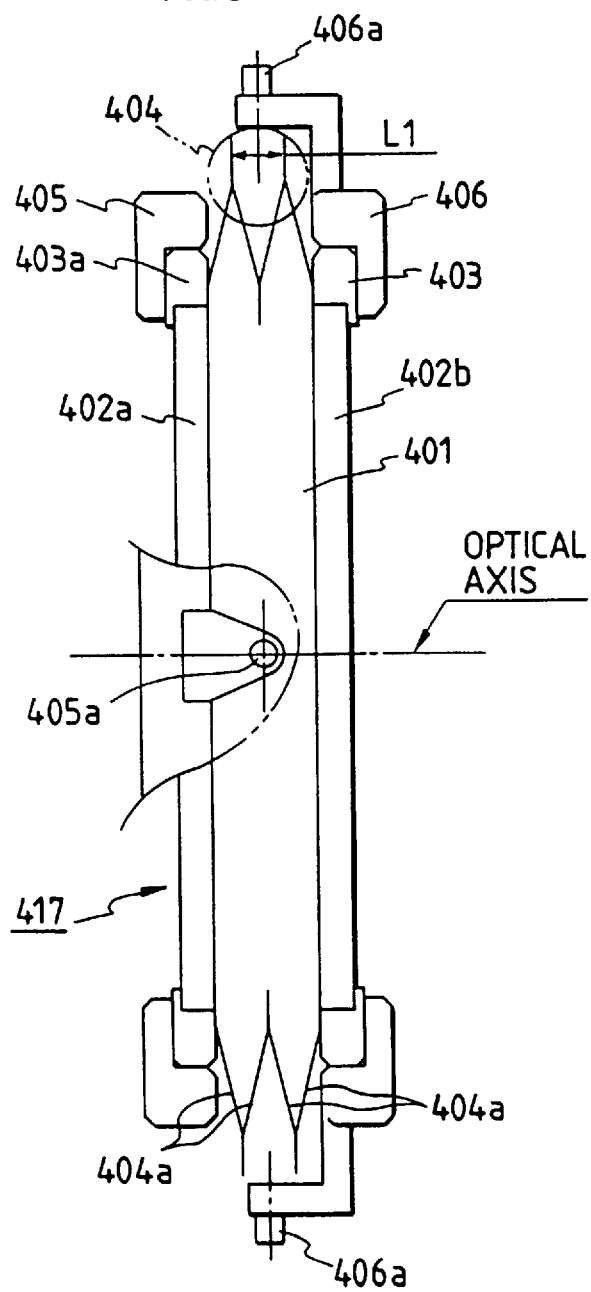
FIG. 20 is a front view of a variable angle prism.
Figure 21:
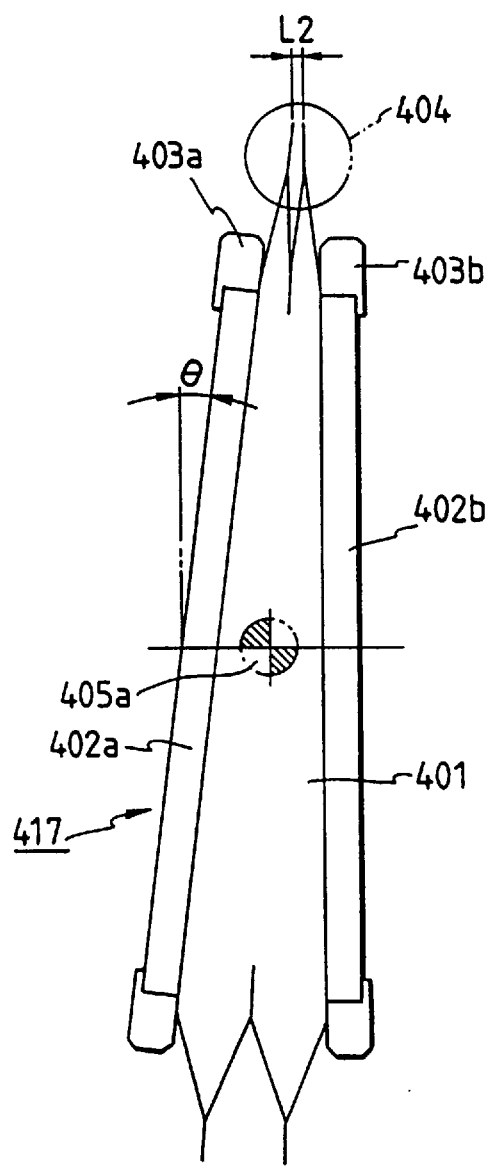
FIG. 21 is a front view of the variable angle prism which has effected vibration correction.

Consequently, the clearance L3 between outer peripheral welded portions 420c becomes L3>L1 relative to the clearance L1 in the example of the prior art shown in FIG. 20, and the initial clearance can be made wide.

Consequently, even if during the manufacture, the outer peripheral portions of the films somewhat fall down or become wavy, the initial clearance will be kept wide and therefore, even if the pitch side transparent plate 402a is inclined by a predetermined rotation angle θ for vibration correction, the contact between the outer peripheral portions of the films can be prevented.

Figure 8:
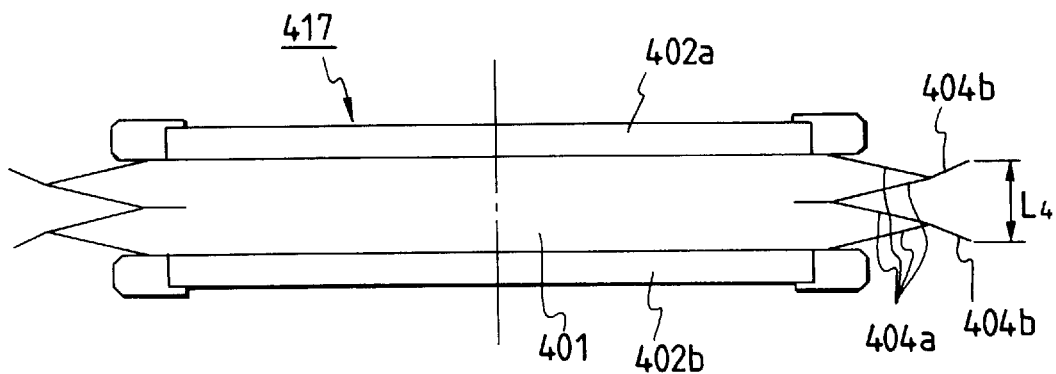
FIG. 8 is a front view of a variable angle prism showing a fourth embodiment of the present invention.
Figure 9:
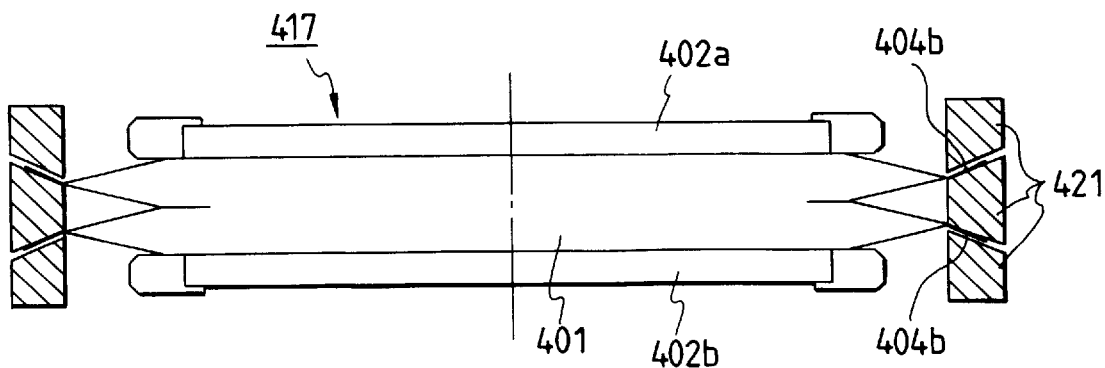
FIG. 9 is an illustration for realizing the fourth embodiment.

FIG. 8 is a front view of a variable angle prism showing a fourth embodiment of the present invention. Four films 404a and 404b are all made of the same material, but after the variable angle prism has been completed, the outer peripheral portions of the films have been forced to fall outwardly to accomplish the forming thereof. FIG. 9 shows an example of the forming, and jigs 421 as non-contact means are used to effect annealing at a high temperature, whereby the clearance L4 between the outer peripheral films in the initial state can be secured sufficiently.

A fifth embodiment of the present invention will now be described.

Figure 10:
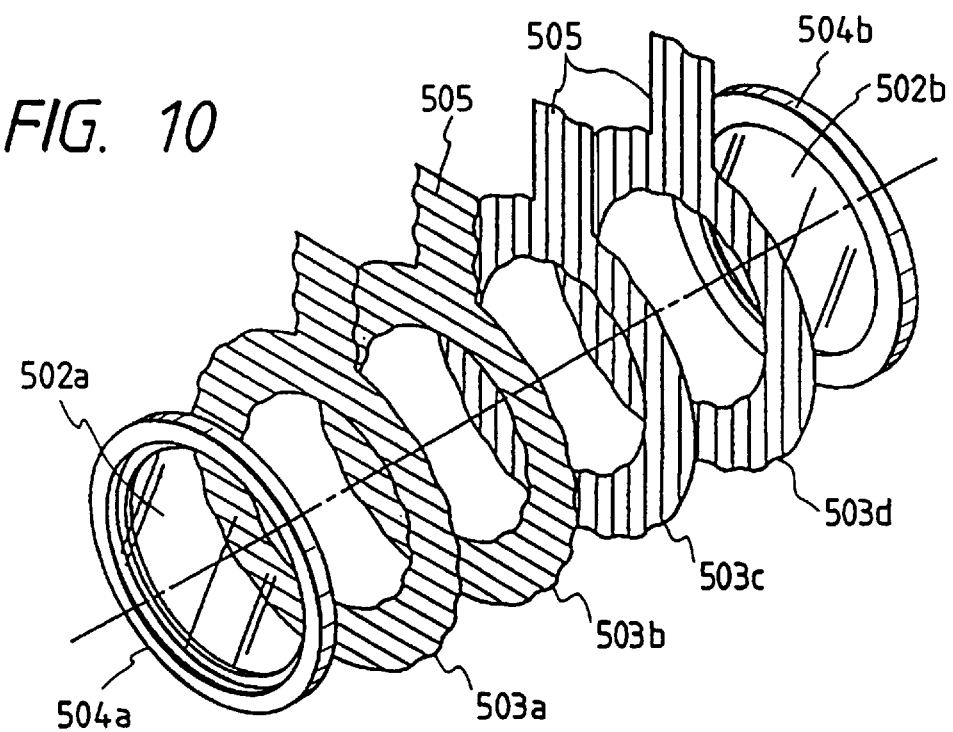
FIG. 10 shows a fifth embodiment of the present invention.

FIG. 10 shows the fifth embodiment of the present invention. A variable angle prism is manufactured by the following procedure. Glass 502a, glass 502b and frame members 504a, 504b of polyethylene rings are first adhesively secured together. Subsequently, film 503a and the polyethylene ring 504a, and film 503d and the polyethylene ring 504b are welded together by welding portions 601a and 601b, respectively, as shown in FIG. 22. On the other hand, the other films 503b and 503c are welded together by a welding portion 601c.

Subsequently, the films 503a and 503b and the films 503c and 503d are welded together by welding portions 602a and 602b, respectively. Thereafter, a predetermined quantity of fluid 501 is poured into a hermetically sealed space through a liquid inlet portion 505 and finally, the films 503a and 503b and the films 503c and 503d are welded together near the root of the liquid inlet portion 505, whereafter the liquid inlet portion 505 is cut off and removed.

When a variable angle prism is to be manufactured by the above-described procedure, a predetermined curl is given in advance to the film. This curl given in advance is the residual wave-like undulation of the whole surface of the film provided by imparting wave-like deformation to the film material when the film material is produced in the form of a roll, thereafter determining the direction and severing the film material into a shape as shown, or severing planar film into a shape as shown, and then passing the film through an uneven roll or working the film by a press machine having wavy opposed surfaces.

That is, wave-like curls at predetermined intervals in the horizontal direction are imparted in advance to the films 503a and 503b and therefore, when the fluid 501 is poured in, the films are deformed along these curls and assume a three-dimensional shape and therefore, even when the variable angle prism is completed, there are created wrinkles in the horizontal direction. Likewise, wave-like curls at predetermined intervals in the vertical direction are imparted in advance to the films 503c and 503d and when the fluid 501 is poured in, there are created wrinkles in the vertical direction.

The films 503a and 503b are joined to a transparent plate 502a rotated in the pitch direction, i.e., the vertical direction, and therefore are deformed in the same direction, but since the direction of the wrinkles is the horizontal direction, these films do not provide ribs against the deformation, but has the effect of reducing a driving load. Likewise, the films 503c and 503d rotate in the yaw direction, i.e., the horizontal direction, but since the direction of the wrinkles is the vertical direction, these films neither provide ribs, but has the effect of reducing the driving load.

Further, the manner in which the wrinkles are formed is determined by the curls imparted in advance and therefore, no difference occurs between individual prisms and the irregularity of the driving load during mass production can be suppressed, and this leads to an improved yield.

According to the fourth and fifth embodiments of the present invention, provision is made of the non-contact means of the outer peripheral portions of the films and therefore, the clearance in the outer peripheral portions of the films can be widened and thus, there takes place no contact between the outer peripheral portions of the films within a predetermined rotation angle, and any increase in the load torque can be prevented to thereby secure a predetermined rotation angle reliably.

Figure 11:
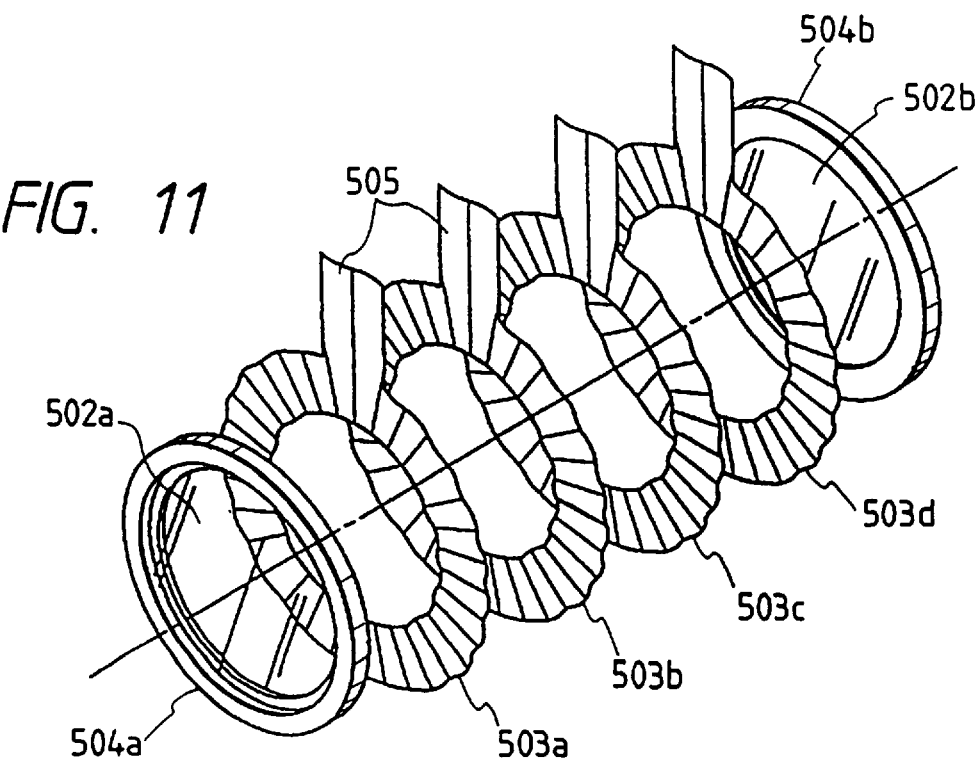
FIG. 11 shows a sixth embodiment of the present invention.

FIG. 11 schematically shows the construction of a variable angle prism according to a sixth embodiment of the present invention.

Films 503a, 503b, 503c and 503d have radial curls imparted in advance thereto, and the intervals between and the sizes of these curls are the same. Thus, the deformation of the films caused when liquid 501 is poured in is oriented by these curls, and radial wrinkles are created in the films.

The relation between the wrinkles opposed to each other is such that if one of the wrinkles is convex, the other wrinkle is concave without fail and therefore, when the variable angle prism is driven, the collision between the wrinkles never happens and a remarkable reduction in the load for driving can be avoided.

Again in this sixth embodiment, the manner in which the wrinkles are formed is determined by the curls imparted in advance and therefore, no difference is created between the individual prisms, and the irregularity of the driving load during mass production can be suppressed, which leads to an improved yield.

Figure 12:
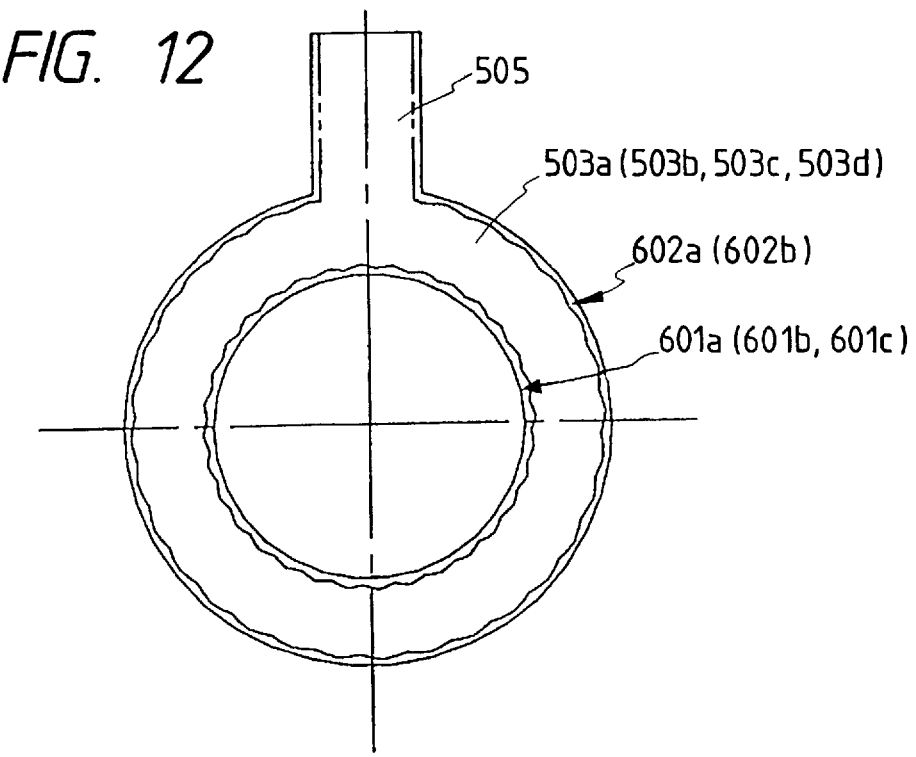
FIG. 12 shows a seventh embodiment of the present invention.

FIG. 12 shows a seventh embodiment of the present invention, and particularly shows the shape of one of films 503a, 503b, 503c and 503d before they are welded together.

The shape of welding portions 601a, 601b, 601c, 602a and 602b when the films 503a, 503b, 503c and 503d are welded together has heretofore been a simple circular ring-like shape. That is, the welding width has been uniform at any location, and this has been the cause of the wrinkles formed when fluid 501 is poured in being made random.

In the present embodiment, the outer peripheries of the welding portions 601a, 601b and 601c are formed into a petal-like shape and the inner peripheries of the welding portions 602a and 602b are formed into a petal-like shape so that the widths of the welding portions may differ from location to location.

If this is done, wrinkles can be formed in conformity with the petal-like shape of the welding portions when fluid 501 is poured in, and no difference is created between individual prisms and the irregularity of the driving load during mass production can be suppressed, which leads to an improved yield.

Figure 13:
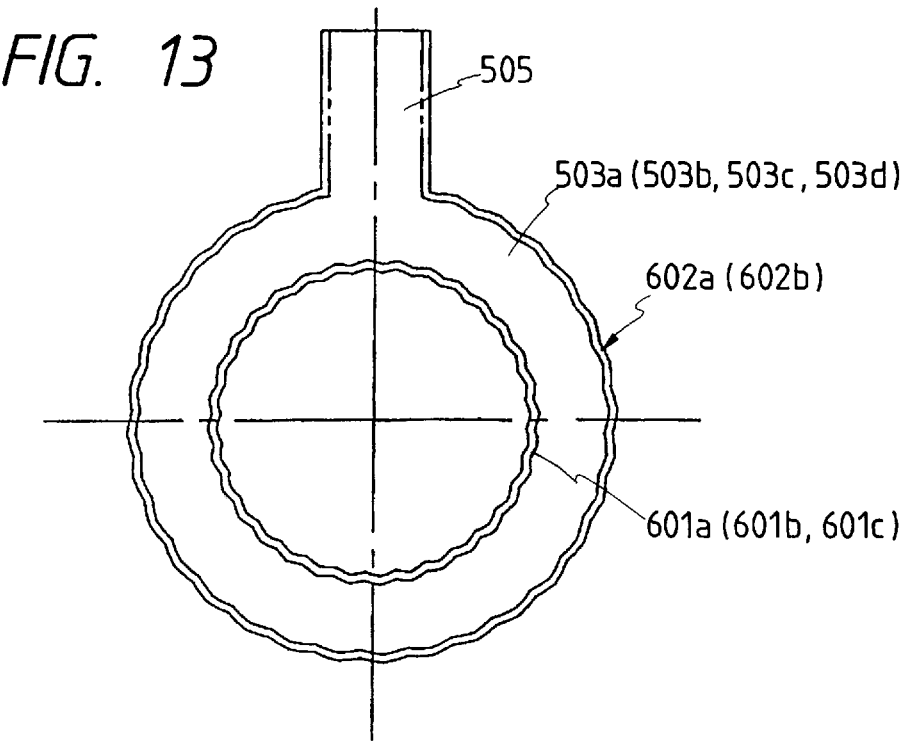
FIG. 13 shows an eighth embodiment of the present invention.

FIG. 13 shows an eighth embodiment of the present invention, and particularly shows the shape of one of films 503a, 503b, 503c and 503d before they are welded together.

In the present embodiment, the shape of the inner and outer peripheries of the welding portions 601a, 601b, 601c, 602a and 602b of the films 503 are made into a petal-like shape and the welding widths are made constant. By the welding widths being made constant, stress applied to the films 503 when the variable angle prism is driven can be made constant and the damage to the films by excessive concentration of stress can be avoided.

Also, as in the seventh embodiment, when fluid 501 is poured in, wrinkles are formed in conformity with the petal-like shape of the welding portions, and no difference is created between individual prisms and the irregularity of the driving load during mass production can be suppressed, which leads to an improved yield.

In each of the above-described embodiments, description has been made of the two-stage bellows using four films, but of course, a similar effect can be obtained for bellows of three or more stages.

According to the sixth, seventh and eighth embodiments of the present invention, predetermined wrinkles are imparted in advance to the films or such a shape that creates predetermined wrinkles is given to the films and therefore, the load for the driving of the vibration correcting means can be reduced and the downsizing and light weight of the driving means and a reduction in consumed electric current can be realized. Moreover, the irregularity during mass production is suppressed and this leads to an improved yield and further to a reduction in mass production costs.

Figure 14:
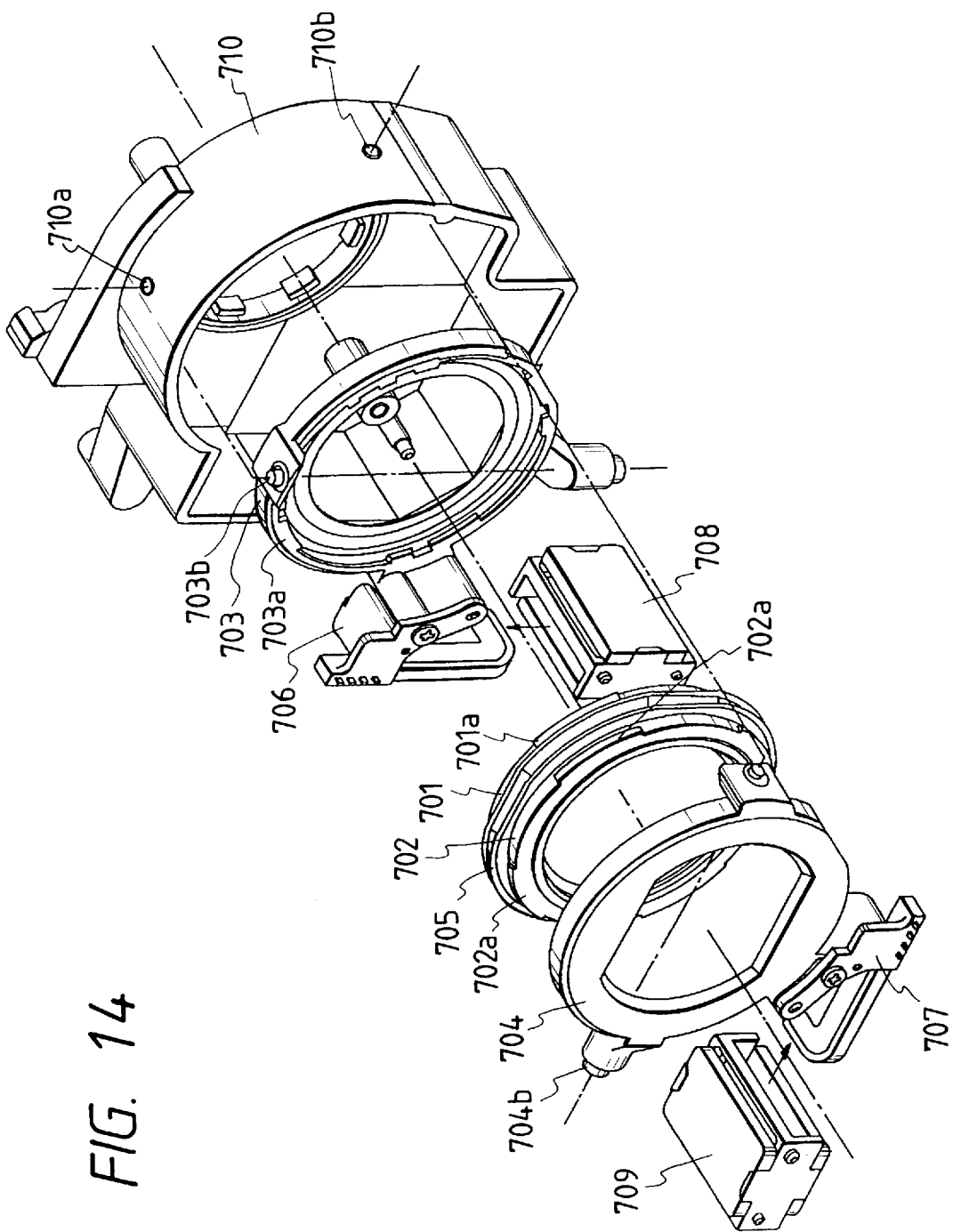
FIG. 14 is a perspective view of an image vibration correcting device according to a ninth embodiment of the present invention.
Figure 15:
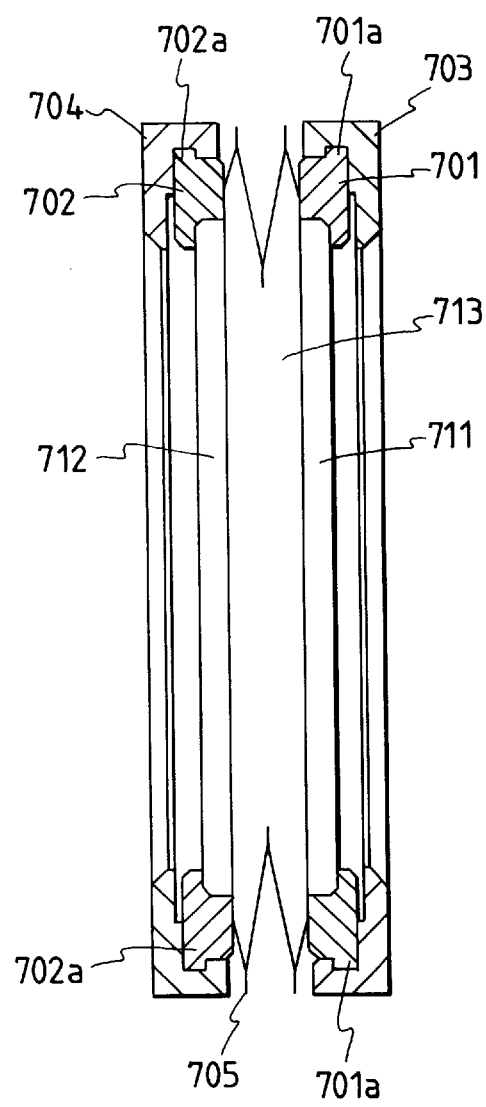
FIG. 15 is a cross-sectional view of the variable angle prism of the image vibration correcting device of FIG. 14 and holding frames holding it.

FIG. 14 is a perspective view of an image vibration correcting device in a ninth embodiment of the present embodiment, and FIG. 15 is a cross-sectional view of a variable angle prism, fixing frames and holding frames. The ninth embodiment of the present invention will hereinafter be described with reference to these figures.

In FIGS. 14 and 15, elements 705, 711, 712 and 713 are similar to the elements of the prior-art device shown in FIG. 23, and the reference numerals 701 and 702 designate fixing frames fixing transparent flat plates 711 and 712, respectively, and constituting a variable angle prism. The fixing frames 701 and 702 have flange portions 701a and 702a, respectively, on the outer peripheries thereof. The reference numeral 703 denotes a yaw side holding frame having a recess fitted to the flange portion 701a, and holding the variable angle prism and varying the vertical angle thereof by the fixing frame 701 being rotated about a yaw side rotational shaft 703b, the reference numeral 704 designates a pitch side holding frame having a recess fitted to the flange portion 702a, and the reference numeral 706 denotes a yaw side movable coil screwed to the yaw side holding frame 703 and disposed in a yaw side magnet unit 708. The reference numeral 707 designates a pitch side movable coil, and the reference numeral 709 denotes a pitch side magnet unit. The reference numeral 710 designates a main lens barrel having bearing portions 710a and 710b for the rotational shafts 703a and 704a of the yaw side and pitch side holding frames 703 and 704.

The variable angle prism is comprised of the pair of transparent flat plates 711 and 712 facing each other, the fixing frames 701 and 702 for fixing the pair of transparent flat plates 711 and 712, respectively, deformable bellows-like film 705 (bellows) for coupling the end surfaces of the variable angle prism comprising the transparent flat plate 711 and the fixing frame 701 or the transparent flat plate 712 and the fixing frame 702, and transparent liquid 713, for example, silicon, filling the space between a pair of end surfaces 711, 701 or 712, 702 and the film 705.

Description will now be made in detail of the coupling between the fixing frames 701, 702 and the holding frames 703, 704 which, with the transparent flat plates 711 and 712, form the pair of end surfaces of the variable angle prism. For the yaw side holding frame 703, the flange portion 701a is provided on the outer periphery of the fixing frame 701, and a rotational bayonet construction is adopted between it and a convex portion 703a provided on that surface of the holding frame 703 which is joined to the fixing frame 701. Accordingly, the holding frame 703 and the fixing frame 701 are closely fixed to each other by the bayonet portion between the flange portion 701a and the convex portion 703a. The fixing frame 701 is rotated by the rotation of the holding frame 703 about the rotational shaft 703b, and a variation in the vertical angle with respect to the yaw direction is attained. The coil 706 screwed to the holding frame 703 is contained in the magnet unit 707, and by the coil 706 being electrically energized, an electromagnetic force is generated, whereby the holding frame 703 can be moved.

A bayonet construction similar to that described above is also adopted with regard to the joint portion between the pitch side holding frame 704 and the fixing frame 702.

As described above, in the image vibration correcting device of the ninth embodiment of the present invention, each of the end surface of the variable angle prism including the transparent plates and the holding member for holding it for rotation about a particular shaft is provided with a bayonet mount for coupling the two together and thus, it becomes unnecessary to use an adhesive agent to couple said two together and it becomes possible to couple said two together in more accurate positional relationship and within a shorter time.

What is claimed is:

1. An optical apparatus comprising:
   a rotatable optical member, said optical member deflecting by rotation a light beam passing through said optical member; and
   a driving device which rotates said optical member, said driving device having a first portion and a second portion which generate a force by an interactive operation with each other, one of said first portion and said second portion being substantially fixed to said optical member said driving device applying the force at a predetermined location of said optical member which is displaced from a center axis of rotation of said optical member, wherein said first portion is provided at a location of said optical member which is substantially the farthest from the center axis of rotation of said optical member.

2. An apparatus according to claim 1, wherein said first portion is provided on a line extending in a direction substantially perpendicular to both the center axis of rotation and an optical axis of the light beam from the point of intersection between the center axis of rotation and the optical axis.

3. An apparatus according to claim 1, wherein said driving device comprises means for driving said optical member by an electromagnetic force generated between said first portion and said second portion.

4. An apparatus according to claim 3, wherein said driving device includes a coil member as one of said first portion and said second portion, and operation means for forming a magnetic field as the other one of said first portion and said second portion.

5. An apparatus according to claim 4, wherein said driving device includes means for supplying an electric current to said coil member.

6. An apparatus according to claim 4, wherein said coil member includes fixing means for fixing said coil member to said optical member.

7. An apparatus according to claim 4, wherein said operation means includes a permanent magnet.

8. An apparatus according to claim 1, wherein said optical member comprises at least a portion of a variable angle prism.

9. An apparatus according to claim 1, wherein said driving device includes means for applying the force to said optical member along a travelling direction of the light beam.

10. An apparatus according to claim 1, wherein a width of said optical apparatus perpendicular to a travelling direction of the light beam is greater than a width of said optical apparatus parallel to the travelling direction of the light beam.

11. An apparatus according to claim 1, wherein said driving device includes means for moving said optical member relative to another optical member.

12. An image blur prevention apparatus comprising:
   a rotatable optical member, said optical member deflecting by rotation an optical axis of light passing through said apparatus; and
   a driving device which rotates said optical member for preventing image blur, said driving device having a first portion and a second portion which generate a force by an interactive operation with each other, one of said first portion and said second portion being substantially fixed to said optical member, said driving device applying the force at a predetermined location of said optical member which is displaced from a center of rotation of said optical member, wherein said first portion is provided at a location of said optical member which is substantially the farthest from the center axis of rotation of said optical member.

13. An optical apparatus comprising:

a rotatable optical member, said optical member deflecting by rotation a light beam passing through said optical member; and a driving device which rotates said optical member, said driving device having a first portion and a second portion which generate a force by an interactive operation with each other, one of said first portion and said second portion being substantially fixed to said optical member said driving device applying the force at a predetermined location of said optical member which is displaced from a center axis of rotation of said optical member, wherein said first portion is provided on a line extending in a direction substantially perpendicular to both the center axis of rotation and an optical axis of the light beam from the point of intersection between the center axis of rotation and the optical axis.

14. An apparatus according to claim 13, wherein said driving device comprises means for driving said optical member by an electromagnetic force generated between said first portion and said second portion.

15. An apparatus according to claim 14, wherein said driving device includes a coil member as one of said first portion and said second portion, and operation means for forming a magnetic field as the other one of said first portion and said second portion.

16. An apparatus according to claim 15, wherein said driving device includes means for supplying an electric current to said coil member.

17. An apparatus according to claim 15, wherein said coil member includes fixing means for fixing said coil member to said optical member.

18. An apparatus according to claim 15, wherein said operation means includes a permanent magnet.

19. An apparatus according to claim 13, wherein said optical member comprises at least a portion of a variable angle prism.

20. An apparatus according to claim 13, wherein said driving device includes means for applying the force to said optical member along a travelling direction of the light beam.

21. An apparatus according to claim 13, wherein a width of said optical apparatus perpendicular to a travelling direction of the light beam is greater than a width of said optical apparatus parallel to the travelling direction of the light beam.

22. An apparatus according to claim 13, wherein said driving device includes means for moving said optical member relative to another optical member.

23. An image blur prevention apparatus comprising:

a rotatable optical member, said optical member deflecting by rotation an optical axis of light passing through said apparatus; and a driving device which rotates said optical member for preventing image blur, said driving device having a first portion and a second portion which generate a force by an interactive operation with each other, one of said first portion and said second portion being substantially fixed to said optical member, said driving device applying the force at a predetermined location of said optical member which is displaced from a center of rotation of said optical member, wherein said first portion is provided on a line extending in a direction substantially perpendicular to both the center axis of rotation and an optical axis of the light beam from the point of intersection between the center axis of rotation and the optical axis.

* * * * *

UNITED STATES PATENT AND TRADEMARK OFFICE
CERTIFICATE OF CORRECTION

PATENT NO. : 5,825,545
DATED : October 20, 1998
INVENTOR(S) : YOSHIKI KINO, ET AL.

It is certified that error appears in the above-identified patent and that said Letters Patent is hereby corrected as shown below:

COLUMN 3,

Line 56, "lead" should read --led--.

COLUMN 4,

Line 33, "production," should read --production--.

COLUMN 7,

Line 16, "intersects" should read --intersect--;
Line 25, "Fi" should read --F1--;
Line 27, "Fi" should read --F1--; and
Line 30, "Fi" should read --F1--.

COLUMN 8,

Line 49, "slit 1ob," should read --slit 110b,--.

COLUMN 9,

Line 54, "120 d" should read --120d--.

UNITED STATES PATENT AND TRADEMARK OFFICE
CERTIFICATE OF CORRECTION

PATENT NO. : 5,825,545
DATED : October 20, 1998
INVENTOR(S) : YOSHIKI KINO, ET AL.

It is certified that error appears in the above-identified patent and that said Letters Patent is hereby corrected as shown below:

COLUMN 15,

Line 19, "member" should read --member,--.

Signed and Sealed this

Twenty-second Day of June, 1999

Attest:

Q. TODD DICKINSON

Attesting Officer     Acting Commissioner of Patents and Trademarks